United States Patent [19]

Tominaga

[11] Patent Number: 5,389,862
[45] Date of Patent: Feb. 14, 1995

[54] ROTATION ANGLE SWITCHING DEVICE
[75] Inventor: Tsutomu Tominaga, Himeji, Japan
[73] Assignee: Mitsubishi Denki Kabushiki Kaisha, Tokyo, Japan
[21] Appl. No.: 942,779
[22] Filed: Sep. 10, 1992
[30] Foreign Application Priority Data Oct. 15, 1991 [JP] Japan ................... 3-266125

[51] Int. Cl.⁶ ............................................. H02P 6/02
[52] U.S. Cl. ..................... 318/254; 318/138; 318/439
[58] Field of Search .......... 318/436, 538, 539, 138, 318/558, 254, 439; 310/254, 261; 188/282, 299, 319

[56] References Cited

U.S. PATENT DOCUMENTS

| 3,766,456 | 10/1973 | Carow | 318/254 |
|---|---|---|---|
| 4,368,411 | 1/1983 | Kidd | 318/254 |
| 4,510,422 | 4/1985 | Ogura | 318/254 |
| 4,631,457 | 12/1986 | Tanuma et al. | 318/467 |
| 4,654,566 | 3/1987 | Erdman | 318/254 |
| 4,678,973 | 7/1987 | Elliott et al. | 318/254 |
| 4,743,815 | 5/1988 | Gee et al. | 318/254 |
| 4,814,676 | 3/1989 | Van Hout | 318/138 |
| 5,034,670 | 7/1991 | Tominaga | 318/436 |

FOREIGN PATENT DOCUMENTS 62-15007 1/1987 Japan .

Primary Examiner—Jonathan Wysocki
Assistant Examiner—John W. Cabeca
Attorney, Agent, or Firm—Sughrue, Mion, Zinn, Macpeak & Seas

[57] ABSTRACT

A rotation angle switching device includes an output shaft connected to a rotatable permanent magnet having pole pairs and a stator around which coils are wound. Three coils are provided for each pole pair. The coils are connected in three pairs star connection. A rotation angle position is selected for the permanent magnet by energizing a first two pairs of coils. When the device is initialized, such as in starting of power supply, after a second two pairs of coils have been energized for a predetermined period of time, a third two pairs of coils, which when energized cause the permanent magnet to move to an original rotation angle position, are energized.

4 Claims, 5 Drawing Sheets

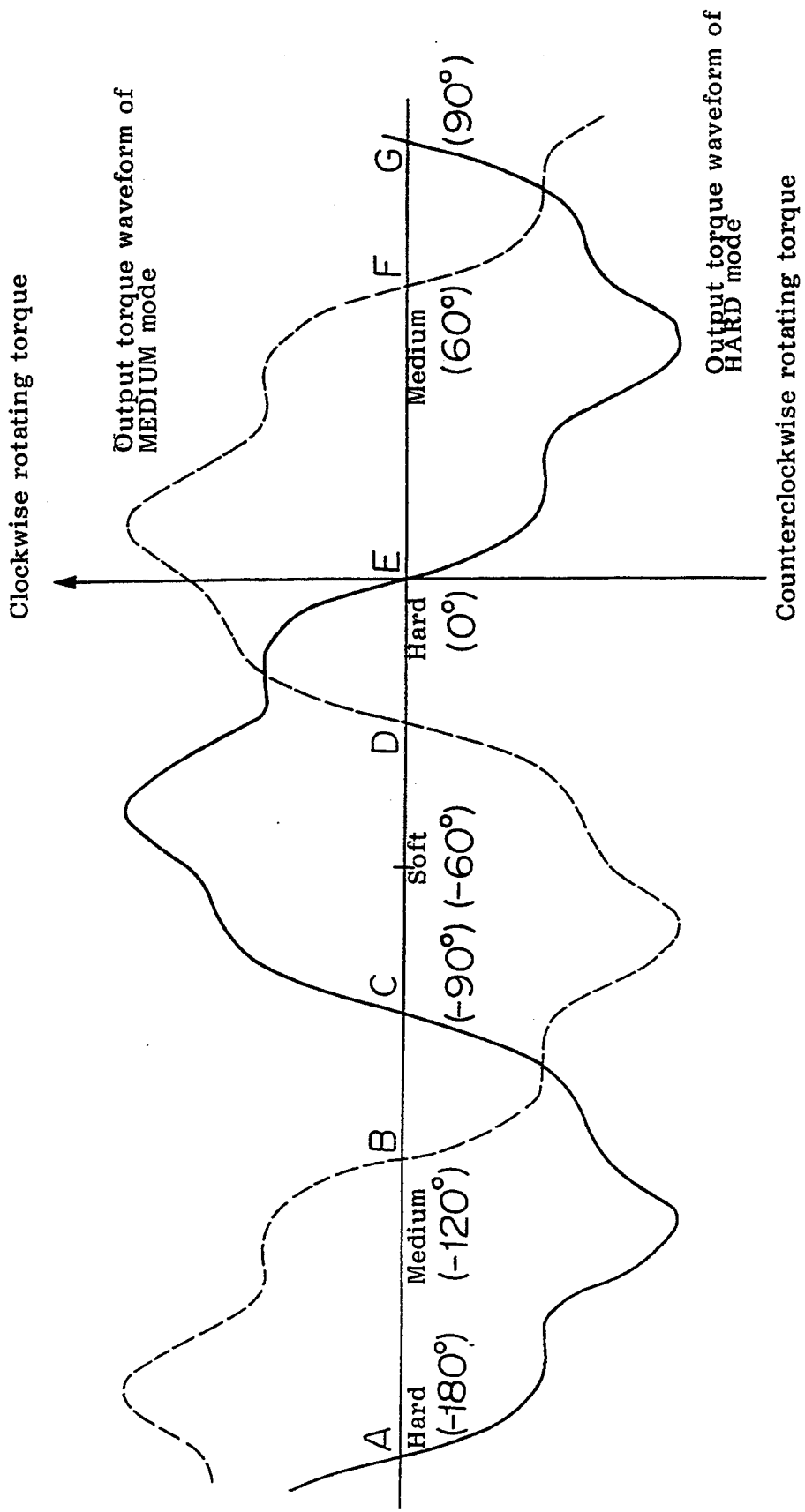

ROTATION ANGLE SWITCHING DEVICE

BACKGROUND OF THE INVENTION

FIELD OF THE INVENTION

The present invention relates to a rotation angle switching device, for instance, for switching an oil passage area of a shock absorber in a damping-force-variable suspension system.

DISCUSSION OF BACKGROUND

A conventional rotation angle switching device which controls a rotation angle position of a switching rod for switching an oil passage area of a damping-force-variable shock absorber for a vehicle, is disclosed for instance, in Japanese Utility Model Publication No. 15007/1987. In this publication, a protrusion provided at a rotor of a stepping motor and a brake piece provided at a stator constitute a stopper for having the rotor return to an original position. In an initializing operation such as that when power is ON, the rotor is driven in the returning direction by a number of pulses corresponding to one complete rotation of the stepping motor (for instance, 48 pulses) by which the protrusion contacts the stopper with certainty, and thereafter, returns to a predetermined initial position (returns to the original position).

Since in the conventional rotation angle switching device, the protrusion contacts the stopper as above, a noise is generated. Furthermore, since the rotor returns to the predetermined initial position after it has been driven in the returning direction by the number of pulses corresponding to one complete rotation of the stepping motor, the time required for the rotor to return to the original position, is prolonged. Moreover, since the number of pulses is determined so that the protrusion contacts the stopper with certainty, residual pulses for one rotation are applied to the rotation angle switching device. Accordingly, the durability of the stopper is deteriorated.

SUMMARY OF THE INVENTION

It is an object of the present invention to solve the above problems and to provide a rotation angle switching device wherein no noise is generated when the rotor returns to the original position, and the time required for the rotor to return to the original position is short.

According to an aspect of the present invention, there is provided a rotation angle switching device comprising:

an output shaft connected to a rotatable permanent magnet said permanent magnet having a plurality of pole pairs; and a stator around which coils are wound said coils being three times as numerous as said pole pairs;

wherein the coils are connected in three pairs star connection; the permanent magnet is provided with a selected rotation angle position by switching current-flowing by selecting a first two pairs of coils; and, in initializing thereof such as in starting of power supply, after the current-flowing has been performed for a predetermined period of time to a second two pairs of coils including coils other than a third two pairs of coils for flowing current in correspondence with an original rotation angle position thereof, the current-flowing is switched to the third two pairs of coils in correspondence with the original rotation angle position.

In the rotation angle switching device of this invention, first, the position of the rotor is switched to the position other than the original position in the initialized operation such as that when power is ON, and next, to the original position. Accordingly, a first position of the permanent magnet wherein torque is not generated when current flows in the coils corresponding to a position other than the original position, differs with a second position of the permanent magnet wherein the torque is not generated when current flows in the coils corresponding to the original position. Accordingly, by switching the current-flowing successively from that corresponding to the first position other than the original position to that corresponding to the original position, the torque is generated in the permanent magnet with certainty at either one of the above two positions, thereby returning the permanent magnet to the original position with certainty.

BRIEF DESCRIPTION OF THE DRAWINGS

FIG. 7 is a diagram showing an output torque waveform in the operation shown in FIGS. 6(a), (b) and 6(c).

DETAILED DESCRIPTION OF THE PREFERRED EMBODIMENT

Figure 1:
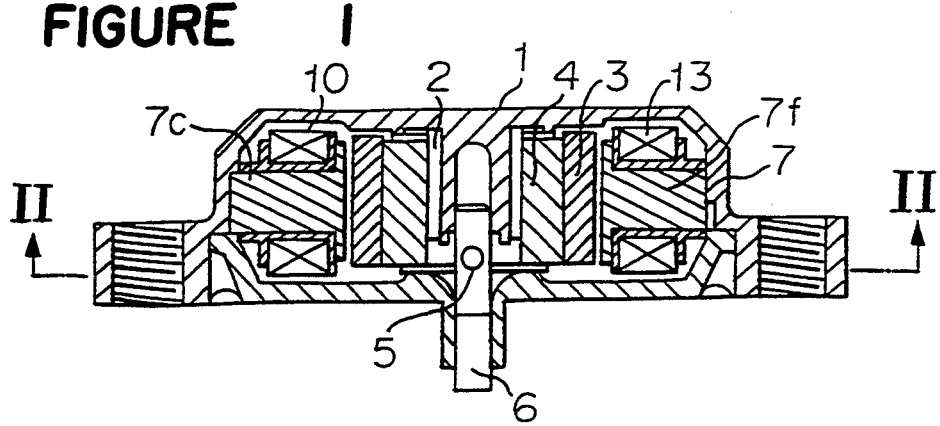
FIG. 1 is a longitudinal sectional diagram showing an embodiment of a rotation angle switching device according to the present invention.
Figure 2:
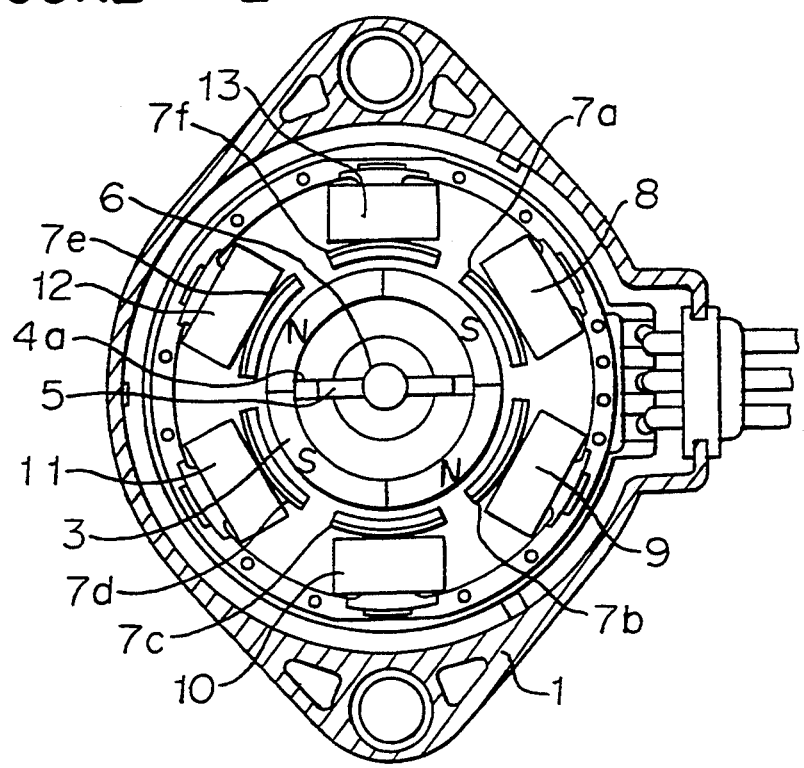
FIG. 2 is a sectional diagram taken along the line II—II of FIG. 1.

Explanation will be given to a rotation angle switching device of this invention referring to FIGS. 1 through 6 as follows. In FIGS. 1 and 2, a reference numeral 1 designates a housing composing an outer casing, 2, a bearing fixed to the housing 1, 3, a ring-like permanent magnet, 4, a yoke adhered and fixed into the permanent magnet 3, and 5, a pin fixed to an output shaft 6. The pin 5 is engaged with a groove 4a of the yoke 4, by which the rotor is composed of the permanent magnet 3, the yoke 4 and the output shaft 6 which rotate integrally. A numeral 7 designates a stator separated from the outer periphery of the permanent magnet 3 in the radial direction, provided with six protrusions 7a through 7f which are separated in the circumferential direction. Openings 7g through 7l are formed between the protrusions (refer to FIG. 6(a) through 6(c)). The respective protrusions 7a through 7f are wound with a first to a sixth coils 8, 9, 10, 11, 12 and 13. Three pairs of the coils are connected in star connection, by which six electromagnets are composed.

Figure 3:
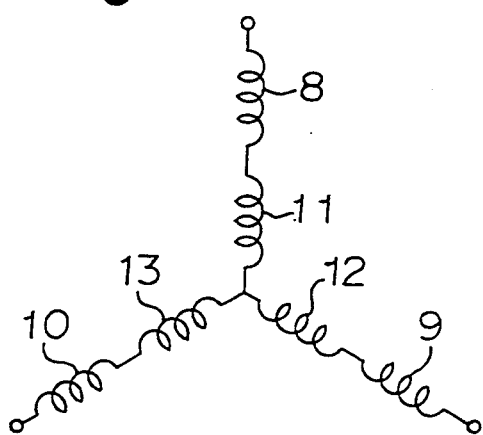
FIG. 3 is a wiring diagram of coil of a stator shown in FIG. 2.

As shown in FIG. 3, in these coils 8 through 13, the first coil 8 attached to the first protrusion 7a and the fourth coil 11 attached to the protrusion 7d opposing to the first protrusion 7a are connected in series. Similarly, the second coil 9 attached to the second protrusion 7b and the fifth coil 12 attached to the fifth protrusion 7e, and the third coil 10 attached to the third protrusion 7c and the sixth coil 13 attached to the sixth protrusion 7f, are respectively connected in series.

Figure 4:
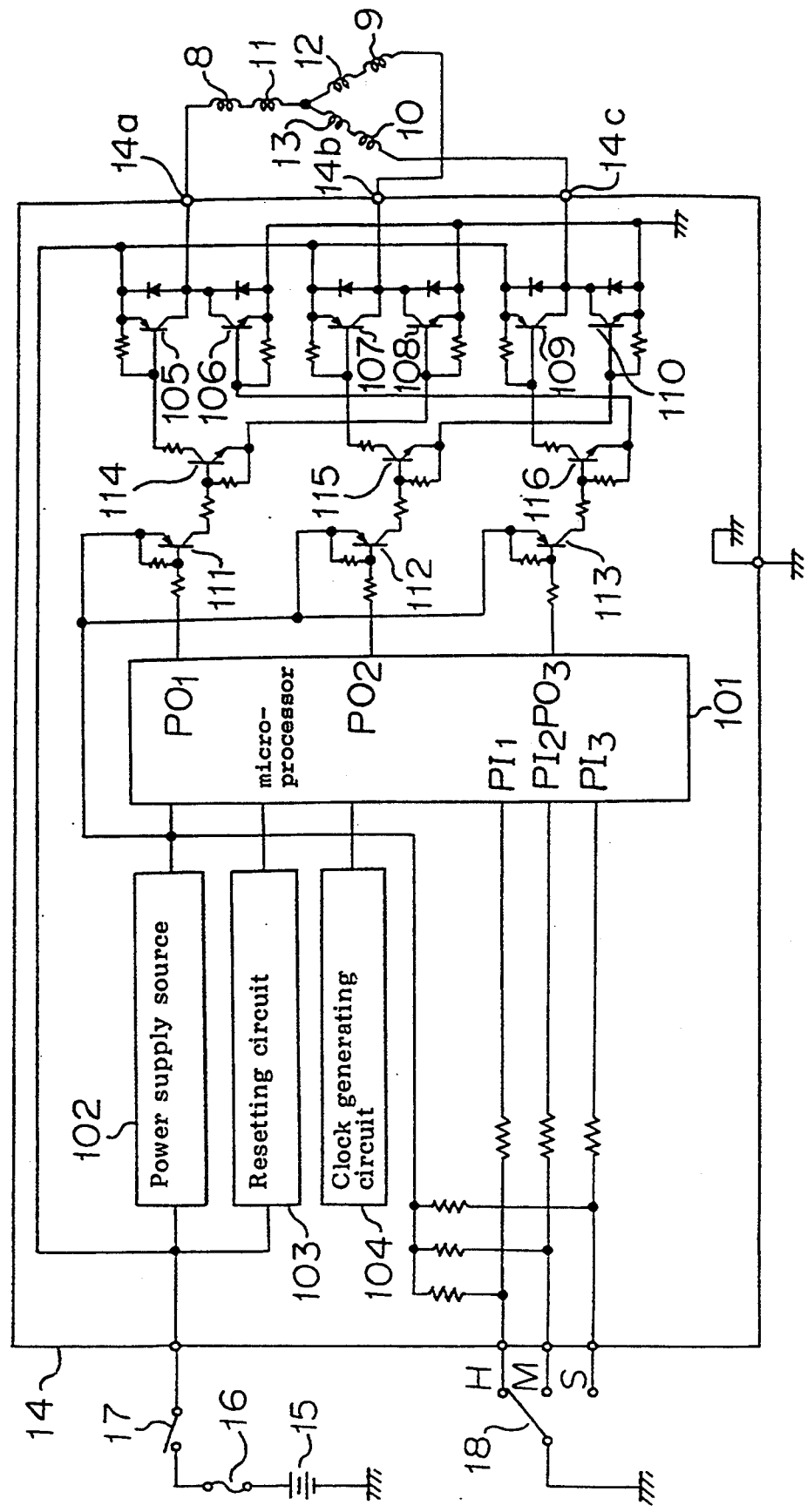
FIG. 4 is a diagram showing a current-flowing switching control circuit for switching current-flowing to the coils shown in FIG. 3.

In FIG. 4, a reference numeral 14 designates a current-flowing switching control circuit, 17, an ignition switch of an automobile, 16, a fuse, and 15, a battery, which are connected as shown in the FIG. A numeral 18 designates an operating switch for a driver to select a hardness of a shock absorber in three stages of H, M and S, which is connected to input ports $PI_1$ through $PI_3$ of a microprocessor 101. A power supply source 102, a resetting circuit 103 for resetting the microprocessor 101 when power is ON, and a clock generating circuit 104 for providing basic clock signals, are connected to the microprocessor 101. Among the three pairs of the coils of the rotation angle switching device, the coils 8, 9 and 10 are connected to output ports $PO_1$ through $PO_3$ of the microprocessor 101 through output transistors 105 through 110.

Next, an explanation will be given to the operation based on a flow chart shown in FIG. 5. When power is ON by the ignition switch 17, the treatment is started. First, in step $S_1$, the operation resets the inside of the microprocessor 101. Next, in step $S_2$, the operation performs the treatment of MEDIUM Mode "M", by which the output port $PO_2$ of the microprocessor 101 is set to low level, while $PO_1$ and $PO_3$ are set to high levels. By this setting, transistors 112 and 115 are conducted, and the output transistors 107 and 110 are conducted. An output terminal 14b of the current-flowing control circuit 14 set to high level, an output terminal 14c, low level, and a current flows successively in an order of coil 9, coil 12, coil 13 and coil 10 (refer to FIG. 6(b)). The second protrusion 7b and the fifth protrusion 7e of the stator 7 becomes N-poles, and the third protrusion 7c and the sixth protrusion 7f becomes S-poles. The N-poles of the second protrusion 7b and the fifth protrusion 7e are repelled by the N-poles of the permanent magnet 3 and attracted by the S-poles thereof, whereas the S-poles of the third protrusion 7c and the sixth protrusion 7f are repelled by the S-poles of the permanent magnet 3 and attracted by the N-poles thereof, thereby generating a rotating torque. As shown in FIG. 6(b), the permanent magnet 3 stops by the attractive forces at a position wherein the S-poles of the permanent magnet 3 oppose the N-poles of the second protrusion 7b and the fifth protrusion 7e, whereas the N-poles of the permanent magnet 3 oppose the S-poles of the third protrusion 7c and the sixth protrusion 7f.

Next, the operation performs the treatment HARD mode "H" in step $S_3$, wherein the output port $PO_1$ of the microprocessor 101 is set to low level, whereas $PO_2$ and $PO_3$ are set to high levels. In this way, transistors 111 and 114 are conducted and the output transistors 105 and 108 are conducted. The output terminal 14a of the current-flowing switching control circuit 14 is set to high level, the output terminal 14b, low level, and a current flows successively in an order of the coil 8, the coil 11, the coil 12 and the coil 9 (refer to FIG. 6(a)). The first protrusion 7a of the stator 7 and the fourth protrusion 7d thereof become N-poles and the second protrusion 7b and the fifth protrusion 7e thereof, S-poles. As in MEDIUM mode, the rotor stops at a position shown in FIG. 6(a) by attraction and repulsion of the magnetic poles of the stator 7 and the magnetic poles of the permanent magnet 3.

By successively switching the position of the rotor in the steps $S_2$ and $S_3$, the permanent magnet 3 is positioned with certainty at the position of HARD mode "H" which is the original (initial) position.

In the following, by the treatment of step $S_4$ and the succeeding steps, the permanent magnet 3 rotates in accordance with a position selected by the operating switch 18, by which the damping force of the shock absorber is switched.

First, the operation reads the selected positions of the operation switch 18 from the input ports $PI_1$ through $PI_3$ of the microprocessor 101 in step $S_4$.

Explanation will be given to the operation when the operating switch 18 selects HARD mode "H". Since the permanent magnet 3 is set to HARD position by the treatment of HARD mode $S_3$ in the initializing operation, the mode of the operating switch 18 and the actual mode is HARD (step $S_5$: YES). Therefore, the treatment of the current-flowing switching is not performed.

After the initializing operation, in case wherein SOFT mode "S" is selected by the operating switch 18, the mode of the operating switch 18 is SOFT and not HARD. Therefore, the operation performs the treatment of SOFT mode in step $S_8$. In SOFT mode, the output port $PO_3$ of the microprocessor 101 is set to low level, whereas the output ports $PO_1$ and $PO_2$, high levels. Transistors 113 and 116 are conducted and the output transistors 106 and 109 are conducted. The output terminal 14c of the current-flowing switching control circuit 14 is set to high level, the output terminal 14a, low level, and a current successively flows in an order of the coil 10, the coil 13, the coil 11 and the coil 8 (refer to FIG. 6(c)). The third protrusion 7c and the sixth protrusion 7f of the stator 7 become N-poles, whereas the first protrusion 7a and the forth protrusion 7d thereof, S-poles. As in MEDIUM mode or HARD mode, the rotor stops at a position shown in FIG. 6(c) by attraction and repulsion of the magnetic poles of the stator 7 and the magnetic poles of the permanent magnet 3.

After the initializing operation, in case wherein MEDIUM mode is selected by the operating switch 18, since the pretreating mode is HARD and the mode of the operating switch 18 is MEDIUM, the operation performs the treatment of $S_9$. The MEDIUM treatment is performed as in the initializing operation of MEDIUM treatment.

Figure 5:
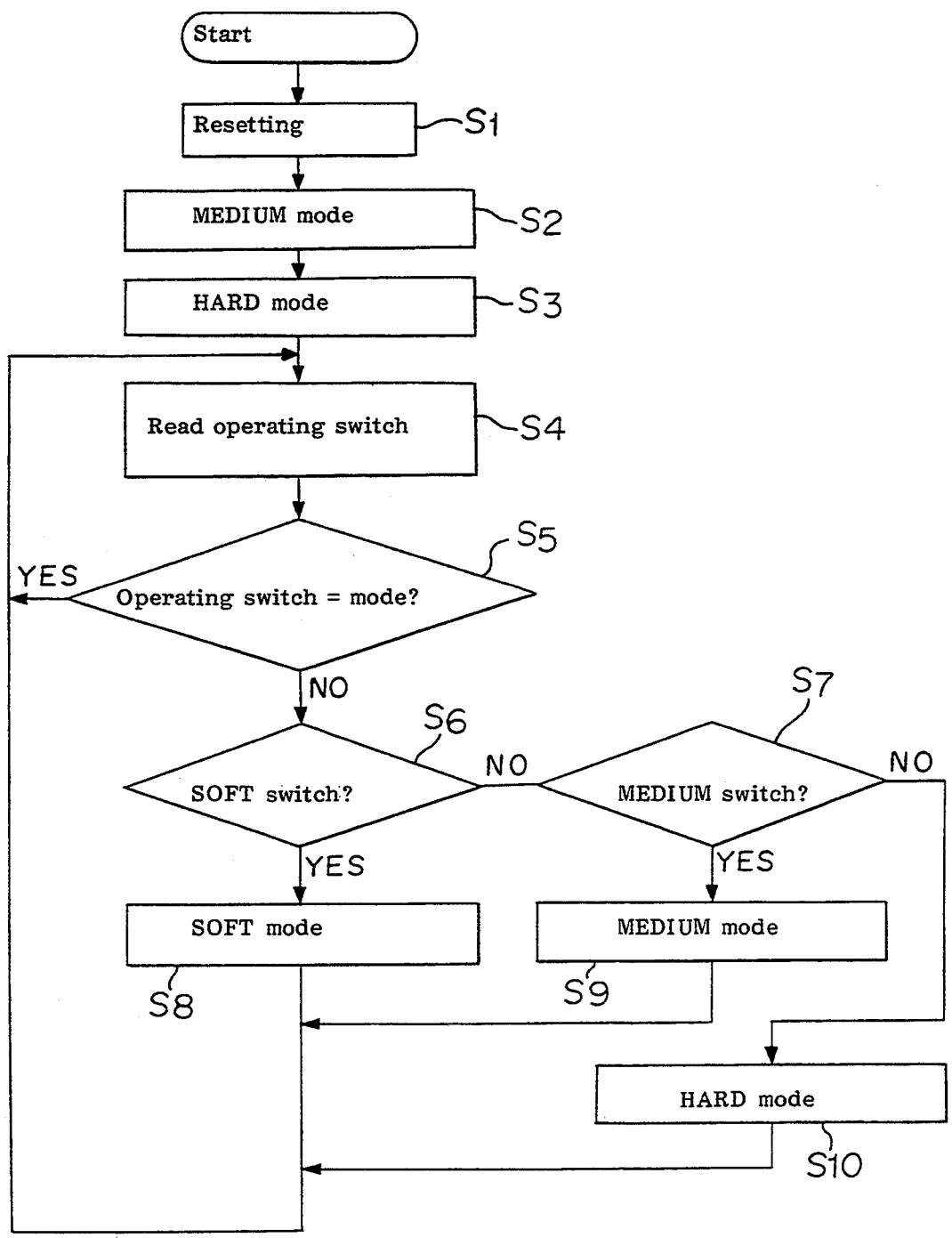
FIG. 5 is a flow chart for explaining a treatment of a microprocessor shown in FIG. 4.
Figure 6A:
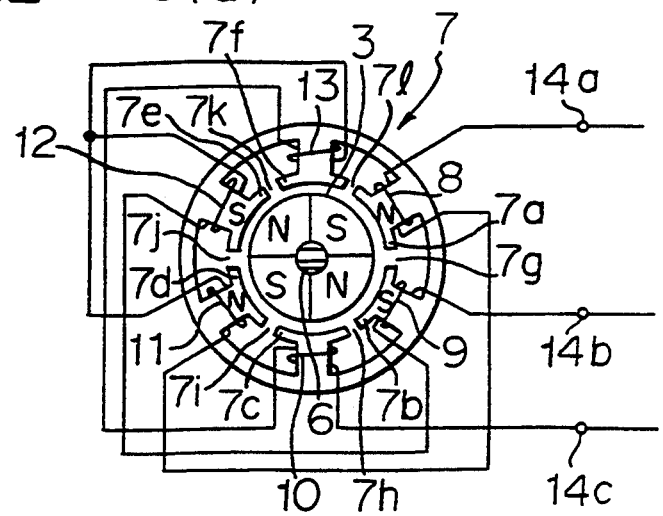
FIGS. 6(a), 6(b) and 6(c) are diagrams for explaining operation of a permanent magnet shown in FIG. 2 and an electromagnet of a stator for rotating the permanent magnet.
Figure 6B:
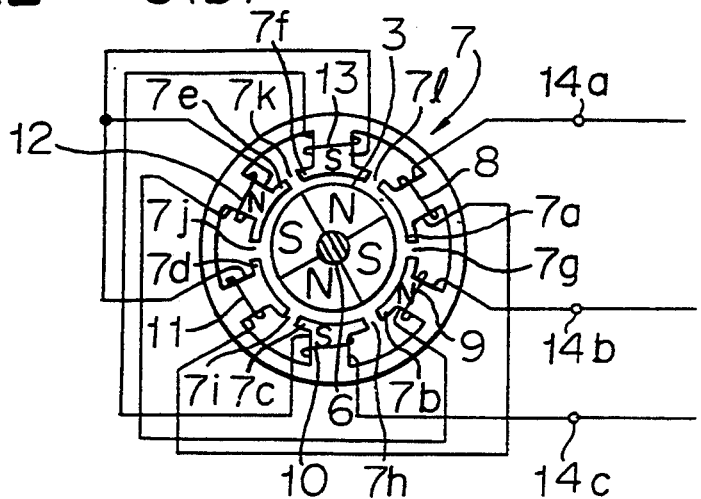
Figure 6C:
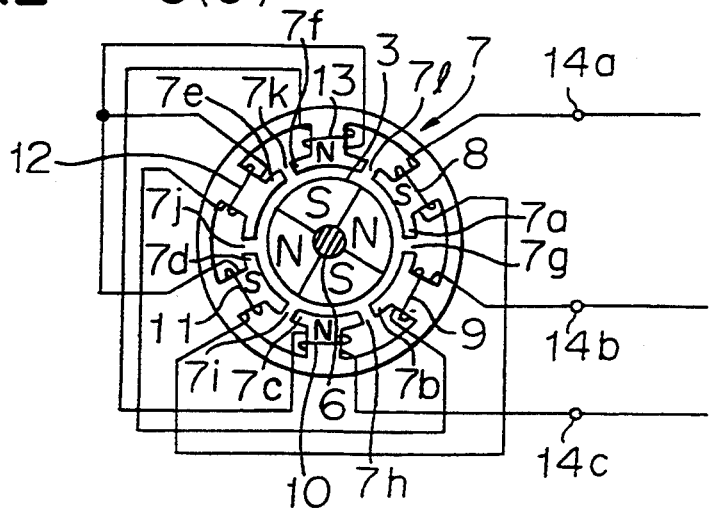

In the succeeding operation, in accordance with the flow chart of FIG. 5, when the mode of the operating switch agrees with the pretreating mode, the operation does nothing. When the mode of the operating switch disagrees with the pretreating mode, the operation performs the treatment in accordance with the operating switch.

In the mean time, in the rotation angle switching device of this kind, as shown in FIG. 7, there are rotation positions at every 90° wherein the torque is not generated. For instance, in HARD mode, these are points A, C, E and G, and in MEDIUM mode, B, D and F. In the initializing operation, when the rotor is to return to the original position after only performing the treatment of HARD mode $S_3$ (without performing the step $S_2$ of FIG. 5), and when the rotation position of the permanent magnet 3 happens to be at point G of FIG. 7 before power is ON (which occurs when the ignition switch 17 is turned to OFF while the rotation angle switching device is being switched), the permanent magnet 3 does not rotate neither to the clockwise or the counterclockwise direction, and can not return to the original position of HARD mode. However, in this invention, since HARD mode treatment is performed after MEDIUM mode treatment, in MEDIUM mode treatment, a counterclockwise rotating torque is generated and the rotor stops at point F, and thereafter a counterclockwise rotating torque is generated and the rotor returns to the original position, the HARD mode position of point E.

As stated above, by switching the current-flowing successively from MEDIUM mode to HARD mode, the torque is generated at either one of MEDIUM mode and HARD mode, the permanent magnet 3 returns to the original position with certainty.

In the above embodiment, the treatment of returning the rotor to the original position is performed by switching to HARD mode after the device is switched to MEDIUM mode wherein current flows in the pairs of coils 9, 10, 12 and 13 including the coils 10 and 13 other than the current-flowing coils of HARD mode 8, 9, 11 and 12. However, the device may be switched to HARD mode after the switching to SOFT mode. Furthermore, the original position may be selected in MEDIUM mode or SOFT mode other than FJORD mode.

As stated above, according to the present invention, after current flows to the two pairs of coils including the coils other than the coils for flowing current corresponding to the original position in the initializing operation as in power ON, for a determined period of time, the current-flowing is switched to the two pairs of coils corresponding to the original position. Accordingly, there is no rotation angle position of the permanent magnet wherein the torque is not generated, and the rotor can return to the original position with certainty. Furthermore, since there is no stopper in this device, no noise is generated and the time for the rotor to return to the original position is short since the rotor can return to the original position in two steps.

What is claimed is:

1. A rotation angle switching device comprising:
an output shaft connected to a rotatable permanent magnet, said permanent magnet having a plurality of pole pairs; and
a stator, around which a plurality of coils are wound, said coils being three times as numerous as said pole pairs;
wherein the coils are connected in three pairs star connection; the permanent magnet is provided with a selected rotation angle position by switching a circuit through which current flows by selecting a first two pairs of coils; and, in initializing thereof such as in starting of power supply, after current has flowed for a predetermined period of time to a second two pairs of coils including coils other than a third two pairs of coils for flowing current in correspondence with an original rotation angle position thereof, the circuit is switched to energize the third two pairs of coils in correspondence with the original rotation angle position.

2. A rotation angle switching device comprising:
a rotatable permanent magnet, having a plurality of pole pairs, said magnet mounted on an output shaft;
a stator having a plurality of protrusions, said stator having three times as many protrusions as said magnet has pole pairs;
a plurality of coils, each of said coils wound around one of said protrusions, said coils being connected in series in pairs, said pairs of said coils being connected in parallel;
an operating switch to allow for selection of specific coil pairs to be energized; and
a microprocessor, to which said operating switch is connected;
wherein said microprocessor energizes specific coil pairs to cause said permanent magnet to move to an original position, and wherein a selection input to said operating switch causes specific coil pairs to be energized which, in turn, causes said permanent magnet to move to a predetermined position dependent upon said selection.

3. A rotation angle switching device according to claim 2, wherein said permanent magnet remains in said predetermined position until another selection is input to said operating switch.

4. A rotation angle switching device according to claim 3, wherein said permanent magnet moves to said original position when said switching device is initialized.

* * * * *